No. 859,927. PATENTED JULY 16, 1907.
E. M. DIXON.
BAKING OVEN.
APPLICATION FILED DEC. 31, 1906.

Inventor:
Ella M. Dixon,

Witnesses:

UNITED STATES PATENT OFFICE.

ELLA M. DIXON, OF SPARKSVILLE, INDIANA.

BAKING-OVEN.

No. 859,927.  Specification of Letters Patent.  Patented July 16, 1907.

Application filed December 31, 1906. Serial No. 350,150.

*To all whom it may concern:*

Be it known that I, ELLA M. DIXON, a citizen of the United States, residing at Sparksville, in the county of Jackson and State of Indiana, have invented certain new and useful Improvements in Baking-Ovens, of which the following is a specification.

My invention relates to improvements in baking ovens. Its objects are to provide for the proper baking action of the oven and to carry out that end in a simple, economic and satisfactory manner.

It consists of certain structural features or instrumentalities substantially as hereinafter fully disclosed and specifically pointed out by the claims.

Figure 1:
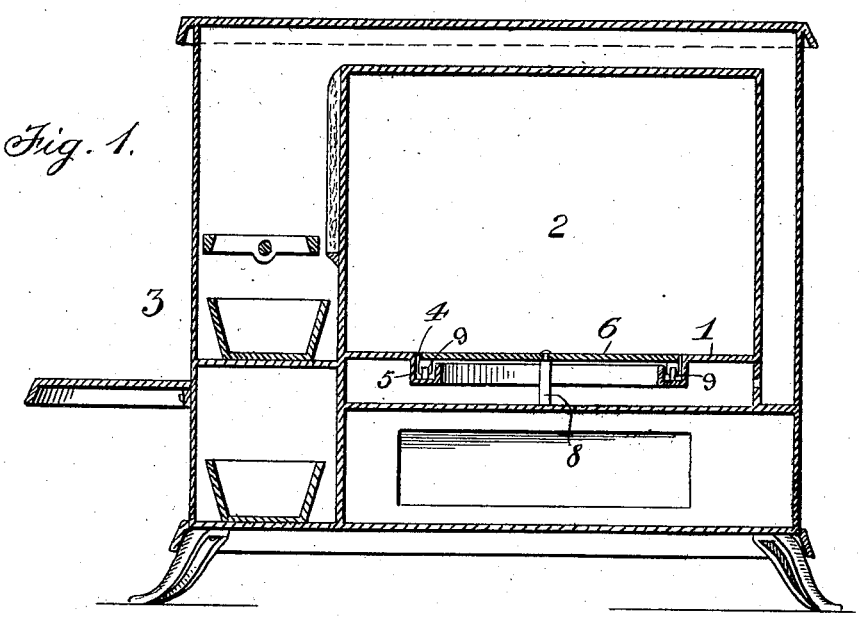
Figure 2:
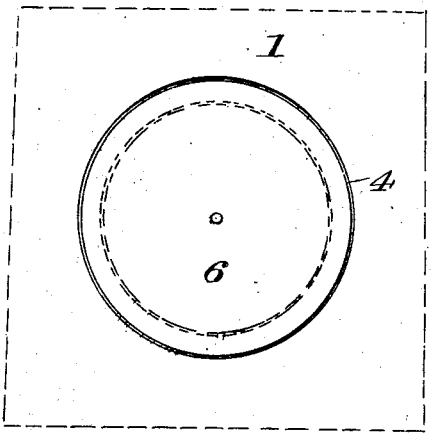
Figure 3:
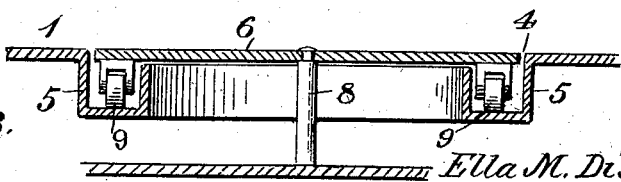

In the accompanying drawing illustrating the preferred embodiment of my invention—Figure 1 is a vertical section produced through the same and the ordinary range-flue below the oven-chamber. Fig. 2 is a horizontal section taken through the oven-chamber and viewing the invention in plan view. Fig. 3 is an enlarged vertical section of the invention.

In the disclosure of my invention, I form the bottom plate 1 of the usual oven-chamber 2 of a stove or range 3, with a preferably circular opening 4, through which the direct action of the heat of the latter may be utilized as presently seen. Said bottom-plate of the oven-chamber, which thus forms the top portion of the range-flue, has provided or formed therein a circular or annular depression or track-way 5, the inner wall of which also forms the outline of the opening 4.

A second plate of disk 6, preferably circular in outline or contour, is arranged to fill in snugly the opening 4, and yet be turned or revolved therein, to form a turn-table upon which is placed the baking or "basting" pan (not shown) for conducting the baking operation. Said disk or turn-table is mounted and revoluble upon the upper pivot-forming end of a post 8 fixed to the bottom wall of the range-flue as shown; and upon the underside of said turn-table are suitably hung a number of rolls 9 traveling in the circular depression or track-way 5 for the retention of said turn-table in balanced operative position. It is obvious that this arrangement allows of the requisite turning or shifting of said turn-table, together with the baking or "basting" pan placed thereon, as in providing for the proper baking operation of the pan-contents as will be readily appreciated. As previously stated, the direct-heating action of the range-flue is thus transmitted to the turn-table bearing the baking or "basting" pan, the advantages of which are apparent.

I claim—

1. A baking oven having its bottom-plate provided with a central heat passage or opening and an annular depression or track-way with its inner wall forming the outline of said passage or opening, and a turn-table arranged within said opening or passage and equipped upon its underside with rolls traveling in said track-way.

2. A baking oven having its bottom-plate provided with a central heat passage or opening and an annular depression or track-way, with its inner wall forming the outline of said opening or passage, a post having a pivot-forming upper end and fixed to the bottom wall of the range-flue, and a turn-table revolubly mounted upon said upper end pivot of said post and arranged to fill in said opening or passage.

In testimony whereof I affix my signature, in presence of two witnesses.

ELLA M. DIXON.

Witnesses:
  J. M. LAWSON,
  H. B. HENDERSON.